Feb. 17, 1970  S. M. PIOTROWSKI  3,495,525
APPARATUS FOR COOKING COMESTIBLES IMMERSED
IN HEATED COOKING OIL
Filed May 17, 1968  4 Sheets-Sheet 4
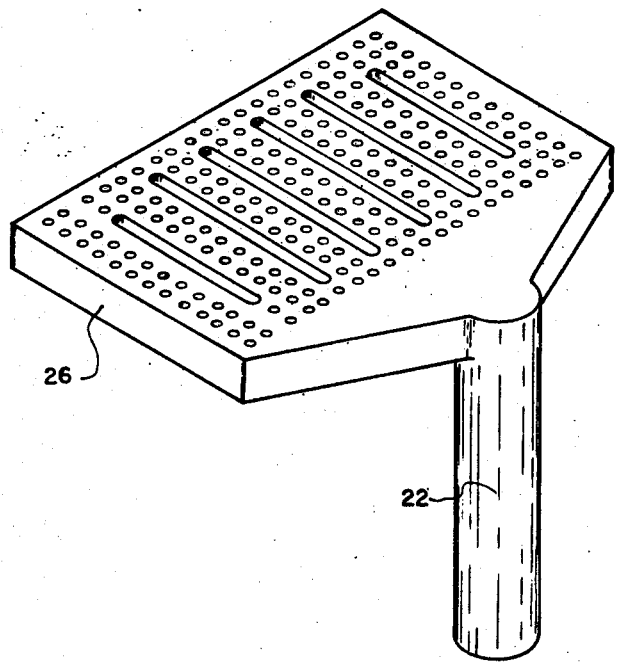
FIG#6

United States Patent Office 3,495,525
Patented Feb. 17, 1970

3,495,525
APPARATUS FOR COOKING COMESTIBLES IMMERSED IN HEATED COOKING OIL
Stephen M. Piotrowski, Dade County, Fla., assignor to Burger King Corporation, a corporation of Florida
Filed May 17, 1968, Ser. No. 730,177
Int. Cl. A47j 37/12
U.S. Cl. 99—408　　　　　　　　　　　　　9 Claims

ABSTRACT OF THE DISCLOSURE

Apparatus for cooking comestibles wherein heated cooking oil is continuously circulated from a cooking pot through a removable filter assembly to a heating manifold mounted immediately below the cooking pot and thence reintroduced into the cooking pot. Temperature controlled heating means is provided beneath the heating manifold and cooking pot to apply heat jointly to the manifold and pot, and means is provided to maintain continuous circulation of the cooking oil.

Background of the invention

This invention relates to the art of cooking and more particularly is concerned with apparatus for carrying out so-called deep fat frying wherein the comestibles to be cooked are immersed in a heated cooking oil. The apparatus is specifically intended for use in restaurants, institutions and the like where a sizeable volume of comestibles is to be deep fat fryed during a relatively short time period.

In the prior art various proposals have been presented for carrying out large volume deep fat cooking, including equipment wherein the heated cooking oil is withdrawn from the container or pot in which the comestibles are to be cooked, filtered, heated and returned to the cooking pot. This equipment has possessed a number of disadvantages among which are the necessity for employing an unreasonably large volume of cooking oil and the necessity for frequently having to replace this large volume of cooking oil due to burning or carbonizing of particles deposited in the oil during the cooking operation. Additionally prior art equipment has been found to lack uniform maintenance of the cooking oil temperature such that the cooking operation is not uniform throughout the cooking pot and the time for cooking the comestibles is not readily fixed and is subject to variations in cooking time within the entire cooking pot.

It is the principal object of the present invention to provide apparatus for deep fat frying of comestibles wherein more uniform cooking temperature and cooking time within the entire cooking pot is achieved.

It is a further important object of this invention to provide apparatus for cooking comestibles in heated cooking oil wherein continuous filtering of the oil and continuous circulation of the oil are carried out at a point remote from the location of heating the oil filtering at such point removing particles from the oil before they are subjected to the high heat of the heating means which would tend to burn or carbonize the particles causing the oil to rapidly deteriorate and require premature replacement.

Another significant object of the instant invention is to provide deep fat frying apparatus wherein the cooking oil is continuously withdrawn from the cooking pot, filtered, heated and returned to the cooking pot with the heat being applied both to the circulating oil and to the bottom of the cooking pot, the continuous circulation giving more even cooking temperature and more reliably determined cooking times for cooking the comestibles.

Another object of the invention is to provide apparatus for cooking comestibles in heated cooking oil wherein the oil is continuously withdrawn from the cooking pot through a removable filter assembly mounted in the bottom of the cooking pot so as to be capable of being easily removed upwardly from the pot and with the filter assembly disposed remote from the location of the application of heat to the cooking pot.

Other objections and advantages of this invention will become apparent from the following description of a specific embodiment of the invention taken in connection with the accompanying drawings, the embodiment of this invention being set forth solely by way of illustration and example.

Brief description of the drawings

FIGURE 6 is a perspective view of the gas burner of the heating means.

Detailed description

Figure 1:
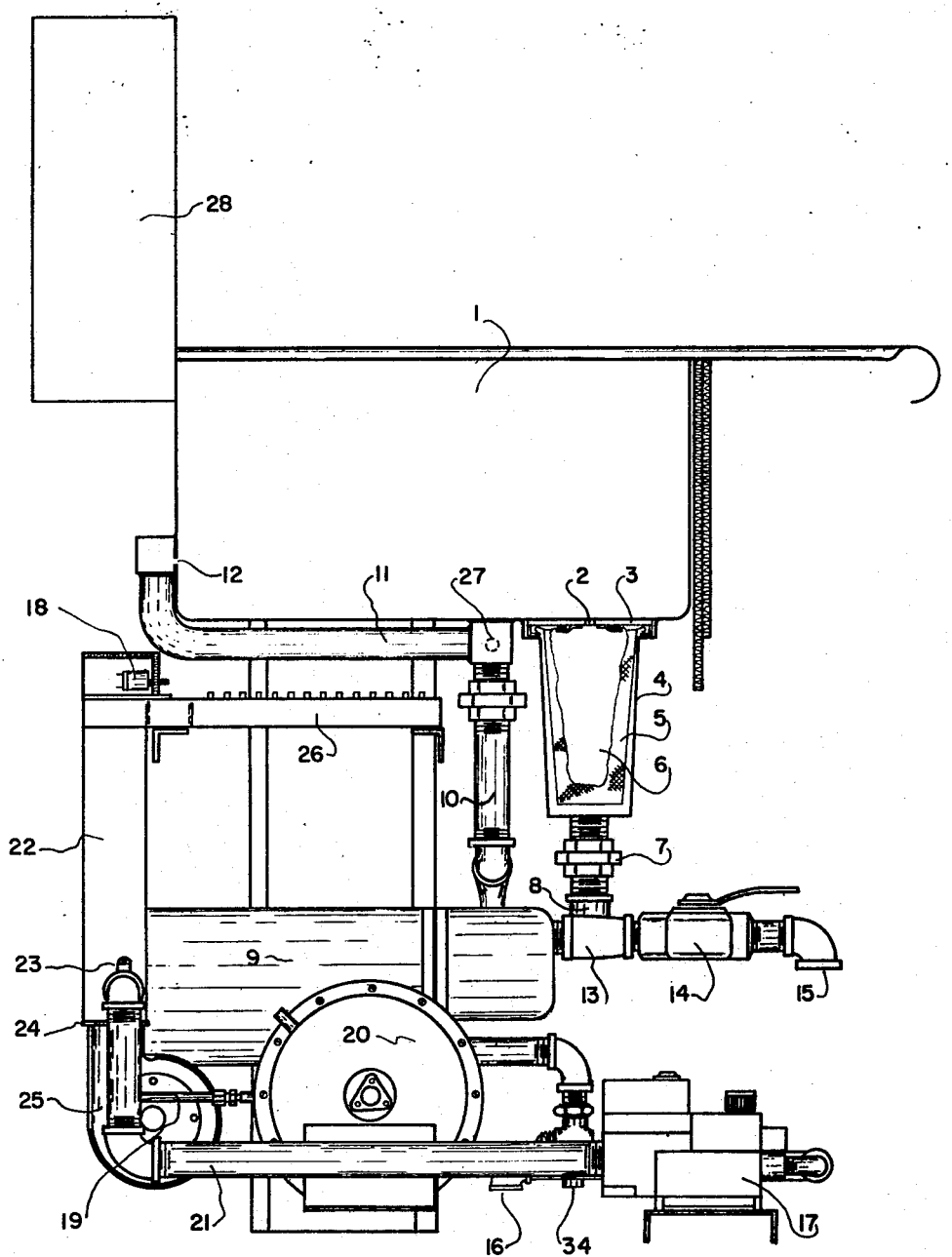
FIGURE 1 is a side elevational view of the cooking apparatus with parts thereof in section and with the mounting cabinet for the apparatus removed.

Referring to the drawings, the overall construction of the cooking apparatus of this invention is illustrated on FIGURE 1. A cooking pot 1 is mounted at an appropriate counter level height in a suitable cabinet (not shown). This cooking pot opens upwardly to receive the comestibles introduced into the pot to be immersed in a quantity of cooking oil retained in the pot. This oil, as will be apparent from the description hereinafter, is constantly circulated by being withdrawn from the pot through a filter chamber, passed through an oil heating manifold and then returned to the cooking pot 1. The constant circulation and thermostatic control of the heating means to provide an oil temperature of about 375° F. maintains the body of oil throughout the cooking pot at the proper temperature such that comestibles being cooked are kept in constant contact with 375° F. cooking oil.

Figure 3:
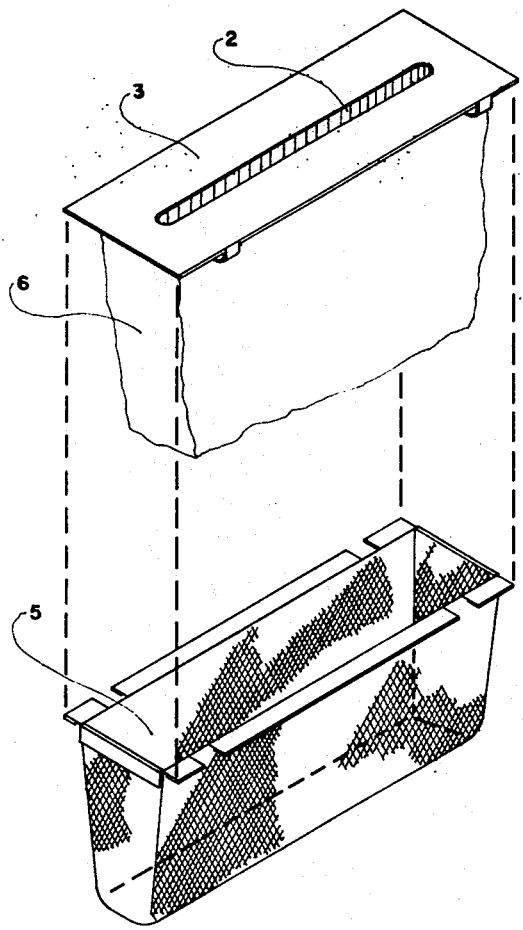
FIGURE 3 is a perspective view of the filter assembly showing the filter basket removed from the cover plate and filter bag.

Near the forward end of the bottom of the cooking pot 1 there is provided a filter chamber 4 which is generally rectangular in horizontal cross section and tapers downwardly from the bottom of the cooking pot. At the junction of this filter chamber with the bottom of the cooking pot a recessed ledge is provided extending around the perimeter of the filter chamber where such chamber joins the outlet of the cooking pot. As will be seen, this recessed ledge permits the filter assembly to be positioned within the filter chamber such that the upper surface of the assembly is essentially flush with the bottom of the cooking pot. The filter assembly is made-up of a cover plate 3 which is generally rectangular as shown in FIGURE 3 and which has an opening 2 in the form of a slot. Preferably the cover plate extends across almost the entire width of the cooking pot 1 and the slot opening thus extends substantially the full width of the cooking pot.

Figure 5:
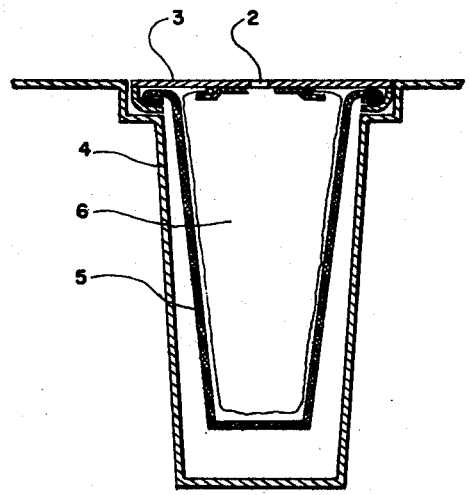
FIGURE 5 is a sectional view through a portion of the bottom of the cooking pot and the filter chamber with the filter assembly mounted therein.

The cover plate 3 is releasably connected to a foraminous basket 5. This basket may be suitably formed of an expanded metal material such as stainless steel. The basket is provided with outwardly directed flanges along its longitudinal sides and, like the filter chamber 4, is generally rectangular in horizontal cross section, tapering downwardly to a greater extent than the filter chamber 4, as best shown in FIGURE 5. The flanges on the foraminous basket 5 are provided with notches spaced thereon to cooperate with the correspondingly spaced tabs on each longitudinal edge of the cover plate 3.

Figure 4:
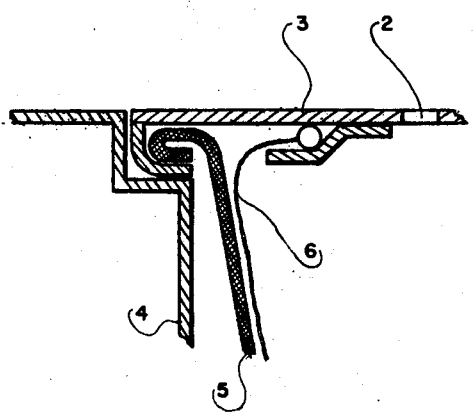
FIGURE 4 is a detailed sectional view showing the relationship between the filter assembly, the bottom of the cooking pot and the filter chamber.

The spatial relationship of the tabs on cover plate 3 and the notches on the basket flanges is such that the cover plate and basket may be placed together with the tabs, which extend downwardly and inwardly from the plate, passing through the notches on the basket flanges. Thereafter the cover plate 3 is moved relative to basket 5 until the ends of the cover plate and basket are in alignment. At this point the tabs will be engaged beneath the flanges of the basket so that the cover plate and basket are held together in the relationship as shown in FIGURE 4.

The filter assembly is completed by the provision of a fabric filter bag 6. In the assembly as illustrated the upper open end of the bag 6 has a bead therearound which is engaged beneath clips provided on the underside of cover plate 3. This serves to appropriately retain the fabric bag on the cover plate and positions it properly with respect to the slot opening 2 in the cover plate and the foraminous basket 5 in the manner shown in FIGURES 4 and 5.

The filter assembly made-up of cover plate 3, basket 5 and filter bag 6 is simply lowered into the filter chamber 4 through the open cooking pot 1. When properly positioned the upper surface of the cover plate 3 forms a continuation of the bottom of the cooking pot as shown in FIGURES 4 and 5.

With the cooking pot filled with oil either in its heated or unheated state, the filter assembly may easily be removed by merely engaging hooks (not shown) extending down through the body of oil with the opposite ends of the slot opening 2 to have such hooks engage with the underside of cover plate at the ends of slot opening 2. By merely drawing up on such hooks, the entire filter assembly may be lifted out of the filter chamber. Once removed, the filter assembly may be quickly and effectively disassembled to be cleaned by sliding cover plate 2 relative to basket 5 until the tabs on the cover plate align with the notches on the flanges of basket 5. The cover plate and filter bag 6 can then be lifted out of basket 5, as shown in FIGURE 3, whereupon the filter bag 6 will be disengaged from the clips on the cover plate and withdrawn to be replaced by a new bag or cleaned of the material that has been filtered out of the oil. Then the new or cleaned bag is replaced on the clips of the cover plate. The cover plate and basket are then reconnected and the assembly relowered through the oil in cooking pot 1 back to its position within the filter chamber.

The bottom of the filter chamber has an outlet pipe 7 connected thereto. This pipe leads to the suction connection 8 of a rotary electrically driven pump 9. The output of pump 9 is connected to a feeder pipe 10 which opens into the forward end of an oil heating manifold 11.

The manifold 11 is suitably constructed with a forward header connected to feeder pipe 10 and a rear header mounted on the rear wall of the cooking pot 1. The rear header connects through the real wall of pot 1 by means of an inlet 12 which preferably is in the form of a slot extending substantially the full width of the cooking pot so that heated oil is introduced through inlet 12 from the rear header of manifold 11 in the form of a sheet of heated cooking oil for most effective distribution and circulation of the oil within the cooking pot. The forward and rear headers are connected by a series of about ten parallel spaced conduits each extending rearwardly from the forward header and then upwardly to connect with the rear header to complete the manifold 11 as shown in FIGURE 1.

A pipe 13 is connected with the suction connection 8 and outlet pipe 7. This pipe connects through a manually operable control valve 14 to the outlet drain 15. When desired to drain the cooking oil from pot 1, the filter chamber, etc., valve 14 is opened and the oil discharged through drain 15 into a suitable receptacle. The residue of cooking oil that may be left in the rotary pump 9 can be drained through a pet cock drain indicated in 34.

The heating means provided in the cooking apparatus is illustrated as one employing a combustible gas. The burner 26 for this heating means is shown in perspective on FIGURE 6. It is provided with a generally rectangular ported area through which the gas is released. This burner is mounted as shown in FIGURE 1 directly beneath (about one inch) the parallel conduits of the oil heating manifold 11. Thus heat from the burning gas is primarily directed against the manifold to heat the oil circulating therein but is also applied to the rear portion of the bottom of the cooking pot 1. This relationship offers the advantage that maximum heat from the burner is released first in heating the oil in the manifold and secondly in heating the oil in the cooking pot.

Significantly the heating of oil in the cooking pot is carried out at a point remote from the filter assembly. In these circumstances particles which may tend to accumulate in the oil incident cooking of the comestibles will be drawn forwardly into the filter assembly and filtered from the oil before such particles are subjected to high heat in the manifold. This is an important advantage in that the carbonizing or burning of such particles by being exposed to high heat is a significant reason for the oil to break down and rapidly become unusable such that frequent replacement of this large volume of oil would be necessary.

The combustible gas supply for the burner is connected to the cooking apparatus at coupling 16. Gas flow to the burner is controlled by a combination gas valve 17 which provides all manual and automatic control functions for regulating operation of the gas heating. As will be explained more fully hereinafter, valve 17 incorporates a solenoid for opening and closing the valve under control of a thermostat 27. The thermostat is mounted in the forward header of oil heating manifold 11 to sense the temperature of the cooking oil in this header and appropriately open and close the gas valve as heat, or no heat, is called for to maintain the cooking oil at a desired 375° F.

Gas flowing from valve 17 passes through gas line 21 and out of gas orifice 23 into a gas and air mixing chamber 22, such chamber in turn being connected at its upper end with gas burner 26. The gas orifice 23 introduces the gas into the side wall of mixing chamber 22. The lower end 24 of mixing chamber 22 has a blower 25 connected thereto. This blower supplies a proper amount of air for combustion with the gas when released through the ports of burner 26.

The air pressure from blower 25 is conducted through a safety line 19 to a safety switch 20. Safety switch 20 is connected in series with the operating solenoid of gas valve 17. Pressure in line 19, reflecting that blower 25 is operating, will be applied to maintain safety switch 20 closed so that valve 17 may appropriately respond to the control of thermostat 27. Should there be a malfunction in the operation of blower 25, indicating that inadequate air is being supplied to mixing chamber 22, the lowered pressure in line 19 will permit safety switch 20 to open and thereafter valve 17 cannot open to admit further gas to the burner.

A flue 28 is provided at the rear of the cooking pot 1 to conduct away fumes from the gas burner 26 as they pass upwardly and rearwardly behind the cooking pot.

Figure 2:
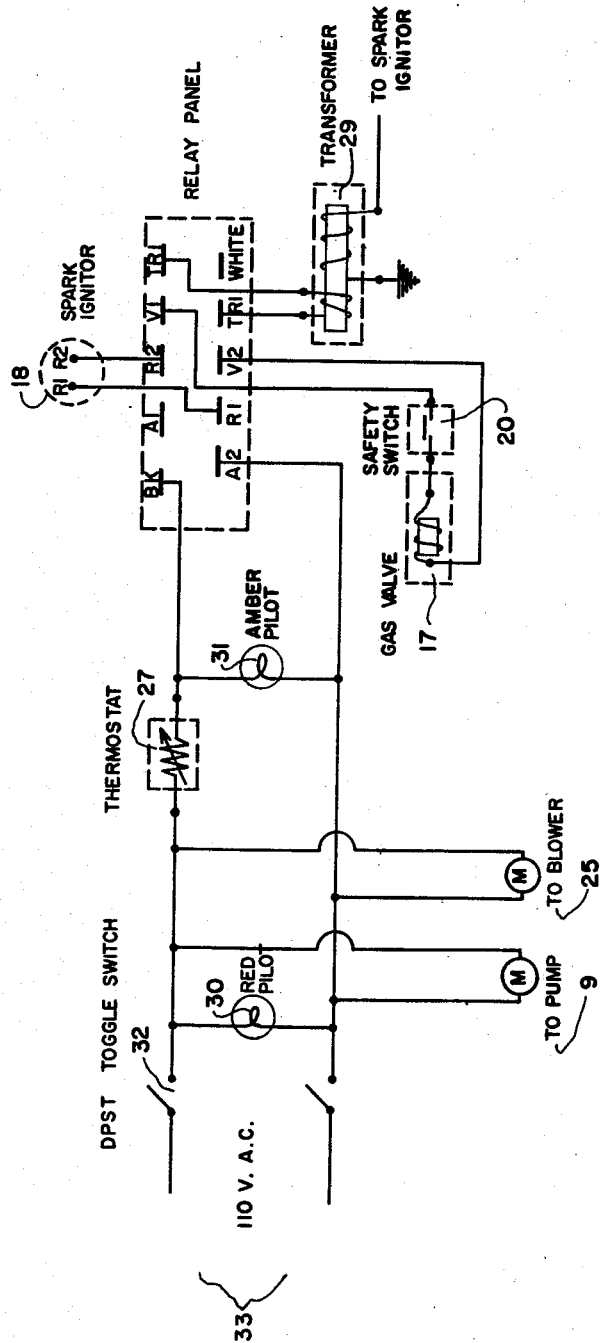
FIGURE 2 is a schematic of the electrical wiring for the cooking apparatus.

Reference may now be made to FIGURE 2 which schematically illustrates the general features of the electric wiring employed with the hereinabove described cooking apparatus. It may be pointed out that the wiring circuit illustrated is only by way of example and its specific features do not form a part of the invention since many different wiring connections may be employed in achieving the desired operation of the cooking apparatus.

The operating energy for the cooking apparatus in the form of an appropriate 110 volt, alternating current supply 33 is connected to a double pole single throw toggle switch 32. When switch 32 is closed red pilot light 30 is lighted indicating that the apparatus has been turned on. Also upon closing switch 32, the pump 9 and blower 25 are energized and commence to operate.

Assuming that the apparatus is being started from a room temperature condition with the oil at room temperature the thermostat 27 will be closed and will thus be calling for heat to immediately ignite the gas burner 26. With thermostat 27 closed, amber pilot light 31 will be lighted to indicate that the gas heating unit is operating. Also with the thermostat closed the relay panel will be energized through terminals BK and A2. Thereupon the spark igniter 18 is energized by a suitable energy force obtained from transformer 29. The spark igniter as shown in FIGURE 21 is mounted at the upper rear surface of burner 26 such that the igniting spark generated when the igniter is energized will ignite gas released through the burner 26. With switch 32 and thermostat 27 still closed, the relay panel will apply energy through terminals V1 and V2 to the safety switch 20 and solenoid of gas valve 17, these two components being connected in series.

Since blower 25 is operating, the blower's air pressure will maintain safety switch 20 closed such that the solenoid of valve 17 will be energized to admit flow of gas to the burner 26. The gas exiting from the burner ports is ignited by spark igniter 18 and the heat of the gas combustion applied to the conduits of the oil heating manifold 11 and underside of the rear portion of the bottom of the cooking pot 1.

Once the gas heating has brought the continuously circulating oil up to the desired temperature of 375° F., the thermostat will open, extinguish the amber pilot light 31 and through the relay panel release the solenoid of the gas valve to cut-off the supply of gas to burner 26 and thus terminate heating of the cooking oil. It will be noted that when thermostat 27 opens, pump 9 and blower 25 both continue to operate and the red pilot light 30 remains lighted indicating that the pump and blower are still energized. Thus the pump continuously circulates the oil irrespective of whether the gas burner is off or on and the gas burner is only reignited when the thermostat 27 closes calling for more heat, indicating that the oil temperature in the forward header of the heating manifold 11 has dropped to a point below the desired temperature of 375° F. Of course the entire cooking apparatus may be turned off by merely opening the switch 32.

Considering that the apparatus is involved in cooking products for human consumption and for sanitary and practical reasons the components such as the cooking pot, filter chamber, filter assembly, piping connectings and oil heating manifold are preferably constructed of stainless steel.

What is claimed is:

1. Apparatus for cooking comestibles immersed in a heated cooking oil comprising:
   an upwardly opening cooking pot having a cooking oil inlet and an outlet formed in the bottom of said pot;
   a filter chamber mounted below said pot communicating with said pot through said outlet;
   a removable filter assembly in said chamber including a foraminous basket, a fabric filter bag in said basket and a cover plate releasably connected to said basket, said cover plate having an opening communicating with the interior of said basket and said bag, said plate being disposed in the pot outlet to position said basket and bag in said filter chamber;
   an outlet pipe connected to said filter chamber,
   an oil heating manifold disposed beneath said cooking pot connected between said outlet pipe and the pot inlet;
   heating means disposed beneath said heating manifold to apply heat therefrom to both said manifold and the bottom of said pot;
   oil temperature responsive means connected to control said heating means to maintain the cooking oil at a desired cooking temperature; and
   means for continuously circulating the cooking oil from said outlet to said inlet of said cooking pot.

2. Apparatus for cooking comestibles as recited in claim 1 wherein:
   said inlet to the cooking pot consists of a slot extending substantially the entire width of the cooking pot and is disposed in the rear wall of said pot; and
   said cover plate is rectangular with said opening therein being in the form of a slot extending substantially the full width of the cooking pot.

3. Apparatus for cooking comestibles as recited in claim 1 wherein:
   said outlet of said pot is provided with a recessed ledge around the perimeter thereof which is engaged by said cover plate such that the upper surface of said plate is disposed flush with the bottom of said pot, and said basket and said bag are suspended from said cover plate in said filter chamber.

4. Apparatus for cooking comestibles as recited in claim 1 wherein:
   said cover plate is rectangular with spaced tabs on each longitudinal edge thereof extending downwardly and inwardly from said plate and means are provided on said plate to retain the upper end of said bag; and
   said basket has outwardly directed notched flanges, the flange notches being disposed to permit said tabs of said cover plate to pass therethrough and the cover plate thereupon be moved longitudinally relative to said basket whereby said tabs engage beneath the flanges of said basket to connect the cover plate and basket.

5. Apparatus for cooking comestibles as recited in claim 1 wherein:
   said oil heating manifold is formed from spaced parallel headers, one header being connected to said outlet pipe and the other header being mounted to communicate with the inlet to said cooking pot;
   said inlet being in the form of an elongated slot in the rear wall of said cooking pot; and
   said headers are connected by spaced parallel conduits for flow of cooking oil therethrough and to receive heat applied from said heating means.

6. Apparatus for cooking comestibles as recited in claim 5 wherein:
   said temperature responsive means is disposed in said one header to sense the temperature of the cooking oil in such header.

7. Apparatus for cooking comestibles as recited in claim 1 wherein:
   said circulating means comprises an electrically driven pump connected to draw oil from said outlet pipe of the filter chamber and supply it to said oil heating manifold.

8. Apparatus for cooking comestibles as recited in claim 1 wherein:
   said heating means is in the form of a gas burner having a generally rectangular ported area to supply heat distributed over a substantial area of said heating manifold and bottom of said cooking pot.

9. Apparatus for cooking comestibles as recited in claim 1 wherein:
   a drainage duct is connected to the outlet pipe of said filter chamber; and a manually controlled valve is disposed in said drainage duct to enable withdrawing the cooking oil from the apparatus when desired.

References Cited

UNITED STATES PATENTS

| | | | |
|---|---|---|---|
| 2,182,735 | 12/1939 | O'Dowd | 99—408 X |
| 3,107,601 | 10/1963 | Longmire | 99—408 X |
| 3,259,521 | 7/1966 | Crall | 99—408 |
| 3,368,682 | 2/1968 | Boots | 99—408 |

ROBERT W. JENKINS, Primary Examiner

U.S. Cl. X.R.

99—403